(12) United States Patent
Aoki et al.

(10) Patent No.: US 8,400,556 B2
(45) Date of Patent: Mar. 19, 2013

(54) DISPLAY CONTROL OF IMAGING APPARATUS AND CAMERA BODY AT FOCUS OPERATION

(75) Inventors: Taizo Aoki, Hyogo (JP); Kiyoshi Ohgishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/637,195

(22) Filed: Dec. 14, 2009

(65) Prior Publication Data
US 2010/0149402 A1 Jun. 17, 2010

(30) Foreign Application Priority Data
Dec. 15, 2008 (JP) ................. 2008-317953

(51) Int. Cl.
*H04N 5/232* (2006.01)
*H04N 5/222* (2006.01)
*H04N 5/262* (2006.01)
(52) U.S. Cl. ............... 348/345; 348/240.2; 348/333.01
(58) Field of Classification Search ............. 348/345, 348/349, 333.03, 333.12, 360, 240.2, 240.99, 348/333.01
See application file for complete search history.

(56) References Cited

U.S. PATENT DOCUMENTS

| 7,453,506 B2 * | 11/2008 | Li ......................... 348/333.12 |
| 2007/0153114 A1 * | 7/2007 | Ueda et al. ............... 348/335 |
| 2007/0242143 A1 * | 10/2007 | Sugimoto ................. 348/240.2 |
| 2008/0024643 A1 * | 1/2008 | Kato ....................... 348/333.12 |
| 2008/0068487 A1 | 3/2008 | Morita |
| 2008/0246852 A1 * | 10/2008 | Mori ........................ 348/347 |
| 2008/0278619 A1 * | 11/2008 | Otsu ........................ 348/349 |
| 2010/0039535 A1 * | 2/2010 | Maeda ..................... 348/240.2 |

FOREIGN PATENT DOCUMENTS

| JP | 11-196301 A | | 7/1999 |
| JP | 2000-125178 A | | 4/2000 |
| JP | 2004-242010 | * | 8/2004 |
| JP | 3649468 B | | 2/2005 |
| JP | 3956861 B | | 5/2007 |
| JP | 2008-70645 | | 3/2008 |
| JP | 2008-72513 | | 3/2008 |
| JP | 2008-216503 | | 9/2008 |

* cited by examiner

*Primary Examiner* — Nhan T Tran
(74) *Attorney, Agent, or Firm* — Panasonic Patent Center (57) ABSTRACT

An imaging apparatus includes an optical system to change a focus state of an image of a subject, an imaging unit to capture the image of the subject formed by the optical system and generate image data, an auto focus controller to control the optical system to focus on a partial area in the image indicated by the image data generated by the imaging unit, a manual focus changing unit to be operated manually by a user to change the focus state of the optical system, a display unit to display the image based on the image data generated by the imaging unit, and a display controller to control the display unit. When detecting that the manual focus changing unit is operated by the user while a focus state is maintained after the autofocus controller controls the optical system to the focus state, the display controller determines, as an enlarged area, an area including a partial area in the focused image by the autofocus controller and controls the display unit to display the image of the determined enlarged area.

14 Claims, 10 Drawing Sheets

DISPLAY CONTROL OF IMAGING APPARATUS AND CAMERA BODY AT FOCUS OPERATION

BACKGROUND

1. Technical Field

The technical field relates to an imaging apparatus capable of adjusting a focus position of an optical system.

2. Description of the Related Art

An imaging apparatus capable of capturing an image by automatically adjusting a focus point has been widely used. After automatically adjusting the focus point on a subject, a user determines whether an imaging operation can h performed or not according to whether to take a photo or not. In order to facilitate the determination of the user, an imaging apparatus is known which allows an image automatically focused to be viewed immediately after the imaging operation.

Japanese Patent No. 3956861, for example, discloses an imaging apparatus in which a focus position of an optical system is automatically adjusted based on a live image, and an area including the focus area is enlarged and displayed. This imaging apparatus displays an indication representing the focus area. The user, therefore, can confirm which part of the image is focused after automatic focus position adjustment.

When confirming whether the focus point of the image to be captured is automatically adjusted or not, it may happen that the image is not focused at the position desired by the user. In such a case, the user needs to repeatedly perform the automatic focus adjusting function or manually adjust the focus position from the beginning to achieve the desired focus position. Therefore, even though the focus position can be confirmed after the imaging operation, the user inconveniently needs to repeat the imaging operation until the desired focus position is obtained.

In order to solve the problem described above, an imaging apparatus is provided which can easily adjust the focus position to obtain the focus point at the position desired by the user.

SUMMARY

In a first aspect, an imaging apparatus is provided, which includes an optical system operable to change a focus state of an image of a subject, an imaging unit operable to capture the image of the subject formed by the optical system and generate image data, an auto focus controller operable to control the optical system to focus on a partial area in the image indicated by the image data generated by the imaging unit, a manual focus changing unit operable to be operated manually by a user to change the focus state of the optical system, a display unit operable to display the image based on the image data generated by the imaging unit, and a display controller operable to control the display unit. When detecting that the manual focus changing unit is operated by the user while a focus state is maintained after the autofocus controller controls the optical system to the focus state, the display controller determines, as an enlarged area, an area including a partial area in the focused image by the autofocus controller and controls the display unit to display the image of the determined enlarged area.

In a second aspect, a camera body to which an interchangeable lens is mountable is provided. The interchangeable lens includes an optical system operable to change a focus state of an image of a subject, and a manual focus changing unit operable to be operated manually by a user to change the focus state of the optical system. The camera body includes an imaging unit operable to capture the image of the subject formed by the optical system and generate image data, an auto focus controller operable to control the optical system to focus on a partial area in the image indicated by the image data generated by the imaging unit, a display unit operable to display the image based on the image data formed by the imaging unit, and a display controller operable to control the display unit. When detecting that the manual focus changing unit is operated by the user while a focus state is maintained after the autofocus controller controls the optical system to the focus state, the display controller determines, as an enlarged area, an area including a partial area in the focused image by the autofocus controller and controls the display unit to display the image of the determined enlarged area.

In the imaging apparatus according to these aspects, the user can perform the manual focus operation while viewing an enlarged image, and therefore the user can easily adjust the focus point as desired at the imaging operation

DETAILED DESCRIPTION OF PREFERRED EMBODIMENT

Preferred embodiments will be described in detail below with reference to the accompanying drawings.

First Embodiment

1. Configuration 1-1 Outline

Figure 1:
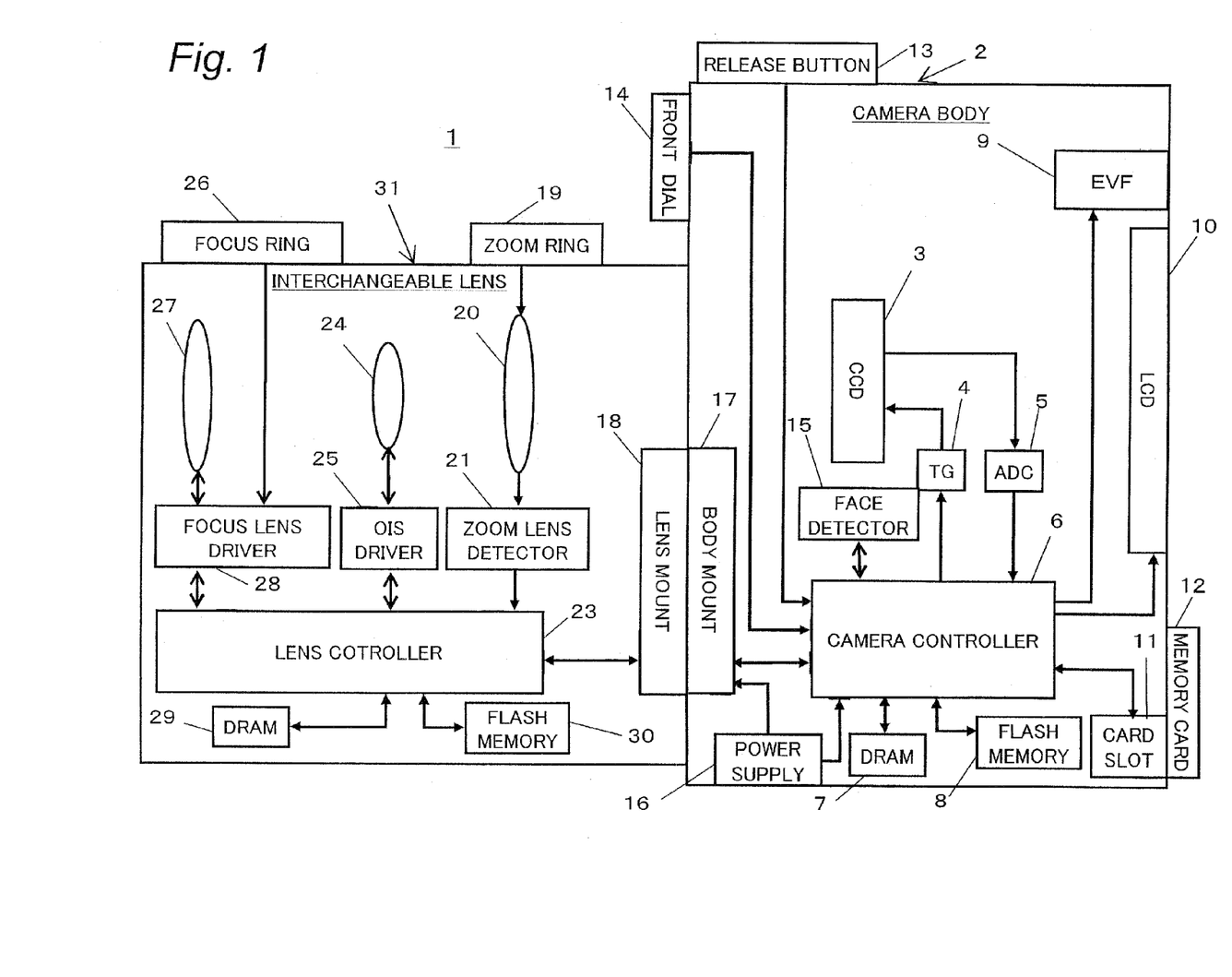
FIG. 1 is a block diagram showing a configuration of an imaging apparatus according to a first embodiment.

FIG. 1 is a block diagram showing an electrical configuration of a camera system 1 according to a first embodiment. The camera system 1 includes a camera body 2 and a detachable interchangeable lens 31 mountable to the camera body 2. The camera system 1 is capable of performing an autofocus operation in a contrast detection method based on image data generated in a CCD image sensor 3.

1-2 Configuration of Camera Body

The camera body 2 includes the CCD image sensor 3, a liquid-crystal device (LCD) monitor 10, an electronic viewfinder (EVF) 9, a camera controller 6, a body mount 17, a front dial 14, a release button 13, a power supply 16 and a card slot 11.

The camera controller 6 controls the whole camera system 1 including the elements such as the CCD image sensor 3 in response to a command from an operating member such as the release button 13. The camera controller 6 transmits a vertical synchronizing signal to a timing generator (TG) 4. In parallel to this operation, the camera controller 6 generates an exposure synchronizing signal based on the vertical synchronizing signal. The camera controller 6 transmits the exposure synchronizing signal thus generated to a lens controller 23 periodically through a body mount 17 and a lens mount 18. The camera controller 6 uses a DRAM 7 as a work memory during the control operation or the image processing operation. The camera controller 6 may be configured by a hardware-wired electronic circuit or a microcomputer using a program. Moreover, the image processing unit and the work memory may be configured on the same semiconductor chip or on different semiconductor chips.

The CCD image sensor 3 captures an image of a subject incident through the interchangeable lens 31 to generate image data. The generated image data is converted to a digital data form from an analog data form by an A/D converter 5. The image data digitized by the A/D converter 5 is subjected to various kinds of image processing by the camera controller 6. The various kinds of image processing as referred to herein include, but not limited thereto, a gamma correction process, a white balance correction process, a flaw correction process, a YC conversion process, an electronic zoom process and a JPEG compression process. In addition, the CCD image sensor 3 may be replaced with another imaging device such as a CMOS image sensor or an NMOS image sensor.

The CCD image sensor 3 operates at the timing controlled by the timing generator (TG) 4. The operation of the CCD image sensor 3 controlled by the timing generator 4 includes an operation of capturing a still image, an operation of capturing a through image, a data transfer operation, an electronic shutter operation, and so on. The through image is mainly a moving image; and is displayed on the LCD monitor 10 or the electronic viewfinder (EVF) 9 to allow a user to determine a composition for capturing a still image.

The LCD monitor 10 is arranged on the rear surface of the camera body 2 and displays the image indicated by the display image data processed in the camera controller 6. The LCD monitor 10 can selectively display a moving image or a still image. In addition to the images, conditions for setting the camera system 1 as a whole can also be displayed. According to the present embodiment, the LCD monitor 10 is shown as an example of a display unit. Nevertheless, the display unit is not limited to the LCD monitor 10, but an organic EL display, for example, may be employed alternatively.

The electronic viewfinder (EVF) 9 is arranged on the upper part of the rear surface of the camera body 2, and displays the image indicated by the display image data processed in the camera controller 6 similarly to the LCD monitor 10.

The images may be displayed on both or either one of the LCD monitor 10 and the electronic viewfinder (EVF) 9. If the images are displayed at the same time on both the LCD monitor 10 and the electronic viewfinder 9, the images may be identical or different.

A flash memory 8 functions as an internal memory to store the image data, and the like. The flash memory 8 also stores programs and parameters used for the control operation of the camera controller 6.

The card slot 11 is a connection unit capable of attaching the memory card 12. The card slot 11 can connect the memory card 12 electrically and mechanically. The card slot 11 may have a function of controlling the memory card 12.

The memory card 12 is an external memory including a memory device such as a flash memory. The memory card 12 can store data such as the image data processed by the camera controller 6. The memory card 12 can also output data such as the image data stored therein. The image data outputted from the memory card 12 is processed by the camera controller 6, and displayed on, for example, the LCD monitor 10 or the like. According to the present embodiment, the memory card 12 is shown as an example of the external memory. Nevertheless, the external memory is not limited to the memory card 12, and may be configured by a storage medium such as an optical disk.

The power supply 16 supplies power to be consumed by the camera system 1. The power supply 16 may be a dry cell or a rechargeable battery. Moreover, the power supply 16 may supply the camera system 1 with power from an external source through a power cord.

The release button 13 is arranged on the top of the camera body 2. A user can perform the operation of capturing a still image, and the like by pressing the release button 13. The operation of pressing the release button 13 includes two steps of operation, i.e., a half-press operation and a full-press operation.

The front dial 14 is arranged, for example, on the front of the camera body 2. The user can change various parameters by operating the front dial 14. The various parameters include an aperture value, a shutter speed and an exposure correction value. In addition, it may be configured that functions corresponding to those by right and left buttons in a cursor button 45 described later may be achieved by user's operation with the front dial 14. Further, it may be configured that the magnification of the enlarged image data displayed on the LCD monitor 10 or the electronic viewfinder 9 may be changed by user's operation with the front dial 14.

The face detector 15 detects the face of the subject contained in the captured image. Various methods are known to detect a human face from the captured image. For example, there is a method to extract skin color information from the original image and regard an image area of a skin color as the "face". In another method, an average human face may be stored as a monochromatic image in a digital camera, and an image area of which a correlation value at each position obtained by comparing the monochromatic image with the captured image is not less than a preset threshold value is determined as the "face". Once the face of the subject is detected by the face detector 15 from the image data, the LCD monitor 10 or the electronic viewfinder 9 may display a frame defining the face of the subject detected in the image.

The body mount 17 can be connected mechanically or electrically with the lens mount 18 of the interchangeable lens 31. The body mount 17 can transmit/receive data between the camera body 2 and the interchangeable lens 31. The body mount 17 sends exposure synchronizing signals and other control signals received from the camera controller 6 to the lens controller 23 through the lens mount 18. The body mount 17 also sends the signal received from the lens controller 23 through the lens mount 18 to the camera controller 6. Further, the body mount 17 supplies power received from the power supply 16 to the interchangeable lens 31 as a whole through the lens mount 18.

1-3 Configuration of Interchangeable Lens

The interchangeable lens 31 includes an optical system, the lens controller 23 and the lens mount 18. The optical system includes a zoom lens 20, an OIS lens 24 and a focus lens 27.

The zoom lens 20 is a lens for changing the magnification of the subject image formed by the optical system of the interchangeable lens 31. The zoom lens 20 may have any number of lenses or lens groups. A zoom ring 19 is arranged outside the interchangeable lens 31. The zoom ring 19 transmits a user operation to the zoom lens 20. This operation moves the zoom lens 20 along the optical axis of the optical system. A zoom lens detector 21 detects an amount of movement of the zoom lens 20. The lens controller 23 can grasp the zoom magnification of the optical system by acquiring a result of detection of the zoom lens detector 21. The zoom magnification grasped by the lens controller 23 is sent to the camera controller 6 through the lens mount 18.

The OIS lens 24 is a lens for correcting the shake of the subject image formed in the optical system of the interchangeable lens 31. The OIS lens 24 may include any number of lenses or lens groups. The OIS lens 24 reduces the shake of the subject image on the CCD image sensor 3 by moving in such a direction as to offset the shake of the camera system 1. The OIS lens 24 is driven by an OIS drive unit 25 based on the result of detection by a shake detector (not shown) such as a gyro sensor. The OIS drive unit 25 obtains the detection result of the shake detector from the lens controller 23. Moreover, the OIS drive unit 25 transmits a signal indicating the ongoing process of optical image shake correction to the lens controller 23. The lens controller 23 transmits the received signal indicating the ongoing process of optical image shake correction to the camera controller 6 through the lens mount 18.

The focus lens 27 is a lens for changing the focus state of the subject image incident from the optical system and formed on the CCD image sensor 3. The focus lens 27 may include any number of lenses or lens groups. The focus lens drive unit 28 drives the focus lens 27 back and forth along the optical axis of the optical system under the control of the lens controller 23. A focus ring 26 is arranged outside the interchangeable lens 31. The focus ring 26 drives the focus lens 27 in accordance with the operation of the user. When the focus ring 27 is operated by the user, an operation signal is outputted to the lens controller 23. The lens controller 23 drives the focus lens drive unit 28 in accordance with the operation signal inputted thereto.

The lens controller 23 controls the interchangeable lens 31 as a whole. The lens controller 23 may be configured by a hardware-wired electronic circuit or a microcomputer using a program.

A DRAM 29 is used as a work memory for the control operation of the lens controller 23. A flash memory 30 stores programs and parameters used for the control operation of the lens controller 23.

1-4 Configuration of Rear Surface of Camera Body

Figure 2:
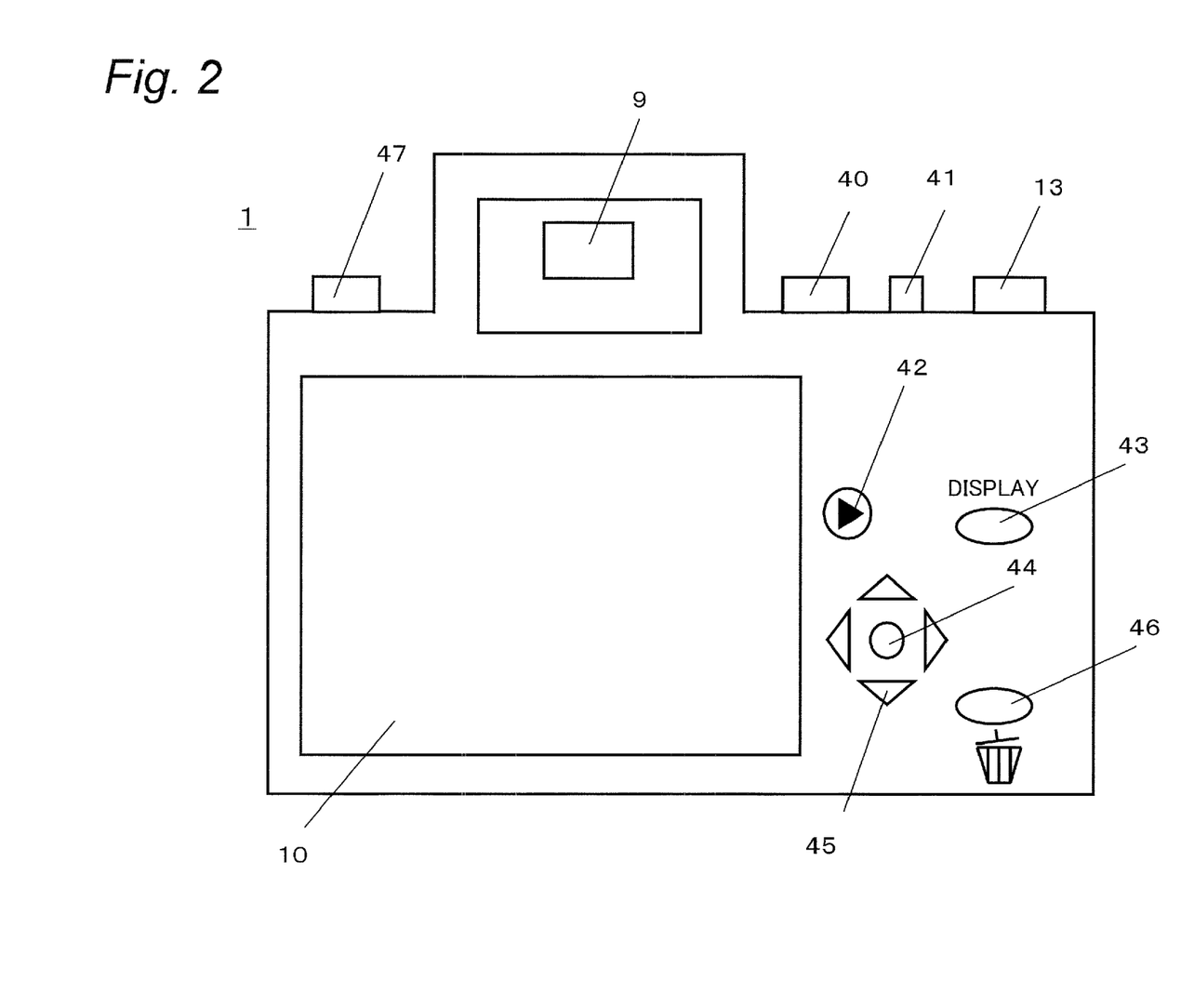
FIG. 2 is a rear view of the imaging apparatus according to the first embodiment.

FIG. 2 is a rear view of the camera body 2. Various buttons 42, 43, . . . are arranged on the rear and upper surfaces of the camera body 2. The LCD monitor 10 and the electronic viewfinder (EVF) 9 are also arranged on the rear surface of the camera body 2. Each of components on the rear surface of the camera body 2 is described in detail below. The release button 13, the electronic viewfinder (EVF) 9 and the LCD monitor 10 are as described above.

A power switch 41 is a slide switch for turning on/off the power of the camera body 2. When the camera body 2 is turned on, the interchangeable lens 31 is also supplied with power through the body mount 17.

An imaging mode dial 40 is a dial for setting the camera system 1 in any one of various imaging modes. The imaging modes include a manual mode, an aperture priority mode, a shutter speed priority mode, a portrait imaging mode, a landscape imaging mode and a macro imaging mode.

A focus mode dial 47 is a dial for setting the focus mode of the camera system 1. The focus mode includes an autofocus mode to focus the subject image automatically and a manual focus mode in which the user can adjust a focus point manually. The autofocus mode includes an AFS (Auto Focus Single) mode to focus the image by the half-press operation of the release button 13 and an AFC (Auto Focus Continuous) mode to continuously focus the image following the motion of the subject.

The cursor button 45 includes an upper button, a right button, a lower button and a left button. Upon depression of the upper button, the camera controller 6 moves up a cursor displayed on the LCD monitor 10. Depression of the right button results in an operation for instructing the cursor to move rightward. Depression of the lower button results in an operation for instructing the cursor to move downward. Depression of the left button results in an operation for instructing the cursor to move leftward.

A set button 44 is a button to be pressed for determining a selection item displayed on the LCD monitor 10. A play button 42 is a button to be pressed for reproducing and displaying the image data stored in the flash memory 8 or the memory card 12. A delete button 46 is a push button for deleting the image data from the flash memory 8 or the memory card 12. A screen button 43 is a button to be pressed for changing the display method of the LCD monitor 10. In accordance with the depression of the screen button 43, the LCD monitor 10 displays or stops displaying a guideline on the screen.

1-5 Correspondence of Terms

The CCD image sensor 3 is an example of an imaging unit. The camera controller 6 is an example of a focus state detector, an autofocus controller and a display controller. The configuration including the focus ring 26 and the focus lens drive unit 28 is an example of a manual focus changing unit. The LCD monitor 10 is an example of the display unit. The configuration including the front dial 14 and the camera controller 6 is an example of a magnification changing unit. The camera system 1 is an example of an imaging apparatus.

2. Operation 2-1 Preparatory Imaging Operation

Figure 3:
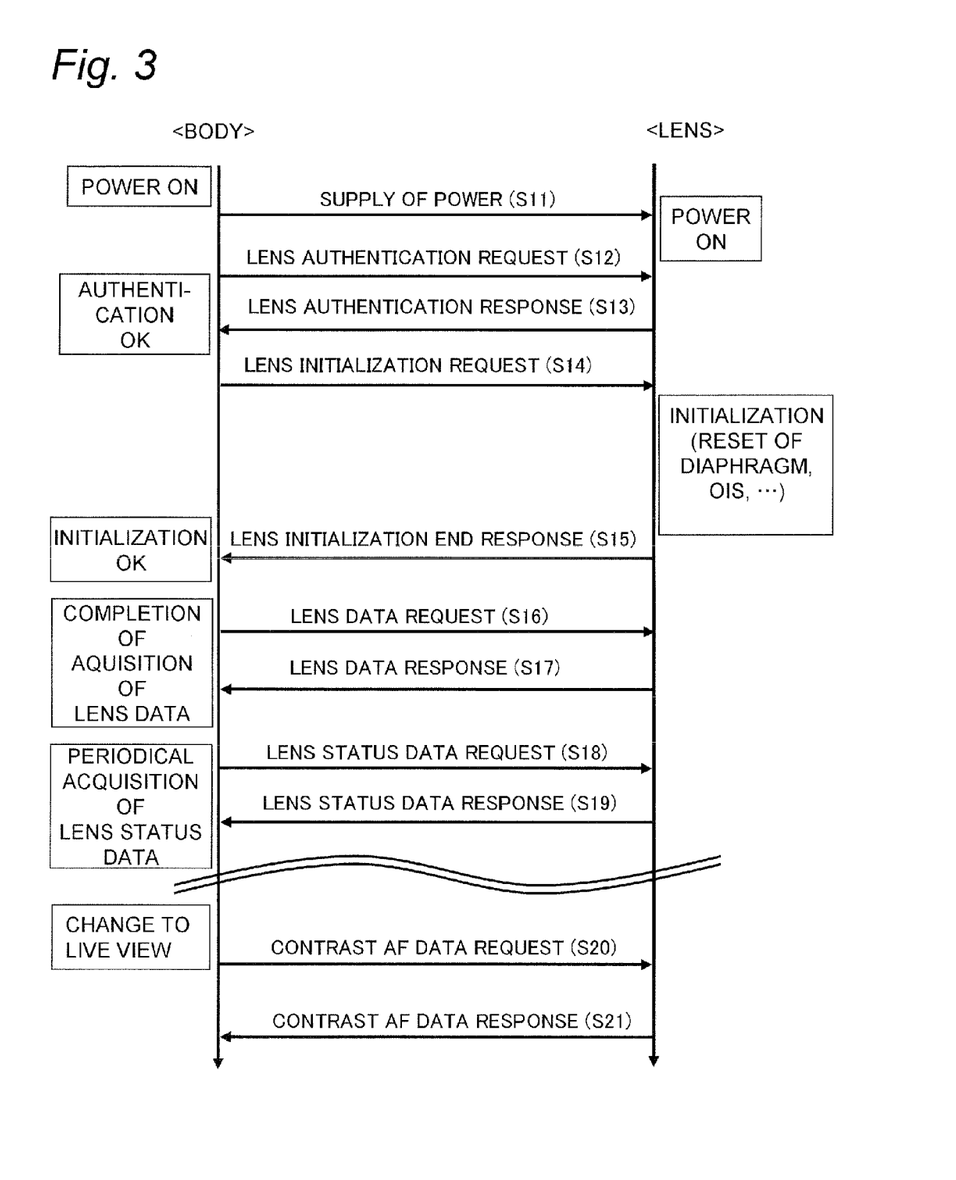
FIG. 3 is a diagram for describing an preparatory imaging operation of the imaging apparatus according to the first embodiment.

The operation of the camera system 1 in preparation for the imaging operation will be described. FIG. 3 is a diagram showing signal transmission and reception in the preparatory imaging operation of the camera system 1.

When the user turns on the camera body 2 with the interchangeable lens 31 mounted to the camera body 2, the power supply 16 supplies power to the interchangeable lens 31 through the body mount 17 and the lens mount 18 (S11). Next, the camera controller 6 requests authentication information for the interchangeable lens 31 from the lens controller 23 (S12). In this case, the authentication information for the interchangeable lens 31 contains information as to whether the interchangeable lens 31 is mounted or not and information as to whether accessories are attached or not. The lens controller 23 responds to the lens authentication request of the camera controller 6 (S13).

Next, the camera controller 6 requests the lens controller 23 to perform an initialize operation (S14). In response to this request, the lens controller 23 performs the initialize operation such as resetting of a diaphragm and the OIS lens 24. Then, the lens controller 23 sends a response indicating completion of the lens initialize operation to the camera controller 6 (S15).

Next, the camera controller 6 requests lens data from the lens controller 23 (S16). The lens data is stored in the flash memory 30. The lens controller 23 reads the lens data from the flash memory 30 and returns the data to the camera controller 6 (S17). In this case, the lens data is characteristic values specific to the interchangeable lens 31 such as a lens name, an F number and a focal length.

When the camera controller 6 obtains the lens data of the interchangeable lens 31 mounted to the camera body 2, the camera system 1 enters a state ready for taking a photo. In this state, the camera controller 6 periodically requests the lens status data indicating the status of the interchangeable lens 31 from the lens controller 23 (S18). The lens status data includes zoom magnification information of the zoom lens 20, position information of the focus lens 27 and aperture value information. In response to this request, the lens controller 23 returns the requested lens status data to the camera controller 6 (S19).

Moreover, in this state, the camera system 1 can operate in the control mode in which the image represented by the image data generated by the CCD image sensor 3 is displayed as a through image on the LCD monitor 10. This control mode is called "live view mode". In the live view mode, a through image is displayed as a moving image on the LCD monitor 10, and therefore, the user can determine the composition to take a still image while watching the LCD monitor 10. The user can determine whether or not to select the live view mode. In addition to the live view mode, the user can select a control mode to lead a subject image from the interchangeable lens 31 to the electronic viewfinder (EVF) 9. The contrast detection method is suitable for the autofocus operation in the live view mode. In the live view mode, the image data are continuously generated by the CCD image sensor 3, and therefore the autofocus operation can be easily performed according to the contrast detection method using the image data continuously generated.

In performing the autofocus operation according to the contrast detection method, the camera controller 6 requests contrast AF data from the lens controller 23 (S20). The contrast AF data is data required for the autofocus operation according to the contrast detection method and include focus drive speed, focus shift amount, image magnification and information on availability of contrast AF.

2-2 Enlarged Image Display Operation

The camera system 1 according to the present embodiment can enlarge and display an image area including the focus position upon receiving the user's operation on the focus ring 26 after the subject is focused by the autofocus operation. With reference to flowcharts of FIGS. 4 and 5, the enlarged image display operation of the camera system 1 according to the present embodiment will be described.

If the camera system 1 is set in autofocus mode (hereinafter referred to "AF mode") in the imaging operation, the camera system 1 automatically detects one or more candidate focus positions of the subject. The AF mode includes a single-point AF mode, a multi-point AF mode and a face detection AF mode.

2-2-1 Determination of Focus Area

Figure 4:
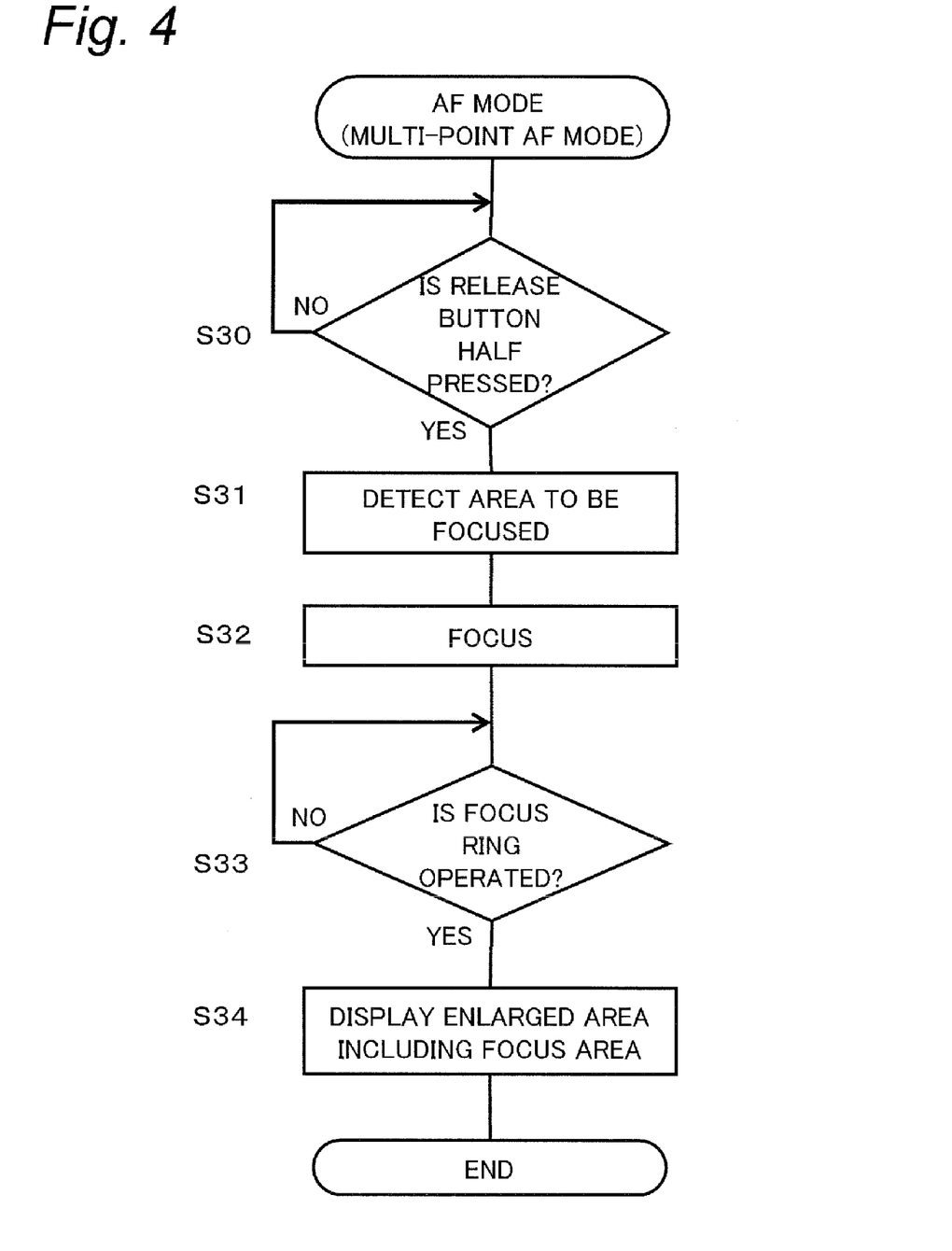
FIG. 4 is a flowchart for an enlarged display operation of the imaging apparatus according to the first embodiment (multi-point AF mode).

Upon the half-press operation of the release button 13 being performed by the user with a candidate focus position(s) detected in AF mode, the camera system 1 focuses the image at the particular detected position(s) (if there are plural candidates, one of them is selected). The operations of focus position detection in multi-point AF mode and face detection AF mode will be specifically described below. FIG. 4 is a flowchart of the camera system 1 in multi-point AF mode and FIG. 5 a flowchart in face detection AF mode.

1) Multi-Point AF Mode

Referring to FIG. 4, when the camera system 1 is set in multi-point AF mode, the camera controller 6 monitors whether the release button 13 is half-pressed or not (S30). In the case where the release button 13 is half-pressed, the camera controller 6 detects the focus state at each of plural (candidate) points in the image indicated by the image data generated by the CCD image sensor 3. Thereafter, the camera controller 6 determines one of the plural points as a focus position based on the result of the focus state detection at each point (S31), and instructs the lens controller 23 to focus the image at the particular focus position. The lens controller 23 controls the focus lens drive unit 28 to drive the focus lens 27 to the focus position (S32). In order to determine a point in the image used as a focus position, a method is available, which selects an image area containing a subject nearest from the camera system 1 or which selects an image area containing a subject largest in size. Various other methods of determining the focus position are available, and the method is not limited to the aforementioned method.

2) Face Detection AF Mode

Figure 5:
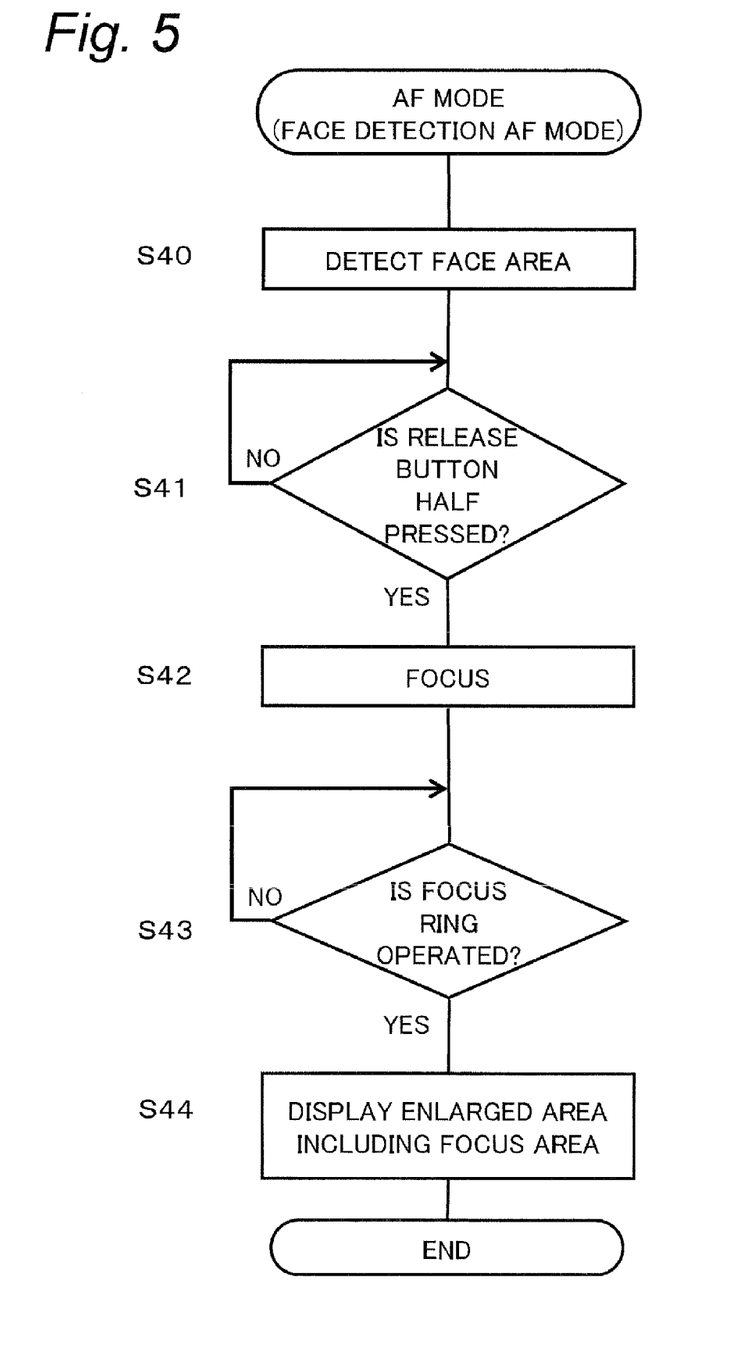
FIG. 5 is a flowchart for the enlarged display operation of the imaging apparatus according to the first embodiment (face detection AF mode).

Referring to FIG. 5, when the camera system 1 is set in face detection AF mode, if the face image is included in the image indicated by the image data generated by the CCD image sensor 3, the face detector 15 detects that image area (S40). Then, the camera controller 6 monitors whether the release button 13 is half-pressed or not (S41). When the release button 13 is half-pressed, the camera controller 6 determines the face area, as a focus position, if the face detector 15 detects the face area, and instructs the lens controller 23 to focus the image at the focus position. The lens controller 23 controls the focus lens drive unit 28 to drive the focus lens 27 to the focus position (S42). In the case where no face is detected in the image upon the half-press operation of the release button 13, the camera controller 6 changes the AF mode to another AF mode such as the single-point AF or the multi-point AF mode. In the case where plural persons are included in the image, the camera system 1 may detect plural face areas. In such a case, the image is focused on the face area determined as that of the most important person at the time of half-press operation of the release button 13 by the user. An example of the face of the most important person is the face of the person nearest to the camera system 1 or the face occupying the largest area in the image. As another alternative, a frequency at which the face of each person is imaged may be stored in the camera system 1, and the face of the most important person may be determined based on this information. In addition, a face for which face authentication-related information is registered in the camera system 1 in advance may be determined as the face of the most important person. Nevertheless, the method of determining the face of the most important person is not limited to those described above.

2-2-2 Manual Focus (MF) Operation After Autofocus (AF) Operation

The operation of the camera system 1 will be described in the case where the image is focused once by the autofocus operation (S30 to S32, S40 to S42) and then the manual focus operation is made while holding the focus state.

As long as the half-pressed state of the release button 13 is maintained by the user, the focus state of the camera system 1 is held. Once the user releases the button 13, however, the focus state of the camera system 1 is canceled.

Referring to FIGS. 4 and 5, while the user maintains the half-pressed state of the release button 13, i.e., the focus state is held after the autofocus operation, the camera system 1 determines whether the focus ring 26 is operated or not by the user (S33, S43). Upon detection that the focus ring 26 is operated by the user (YES in S33, S43), the camera controller 6 determines an enlarged area of the image displayed on the LCD monitor 10 based on the position of the area focused by the autofocus control operation, and controls the LCD monitor 10 to enlarge the image in accordance with the determination (S34, S44).

In this manner, when the focus ring 26 is operated by the user (manual focus operation) with the focus state held (with the release button 13 maintained in half-pressed state) after autofocus operation, the area including the focus area is enlarged and displayed on the LCD monitor 10.

Figure 6:
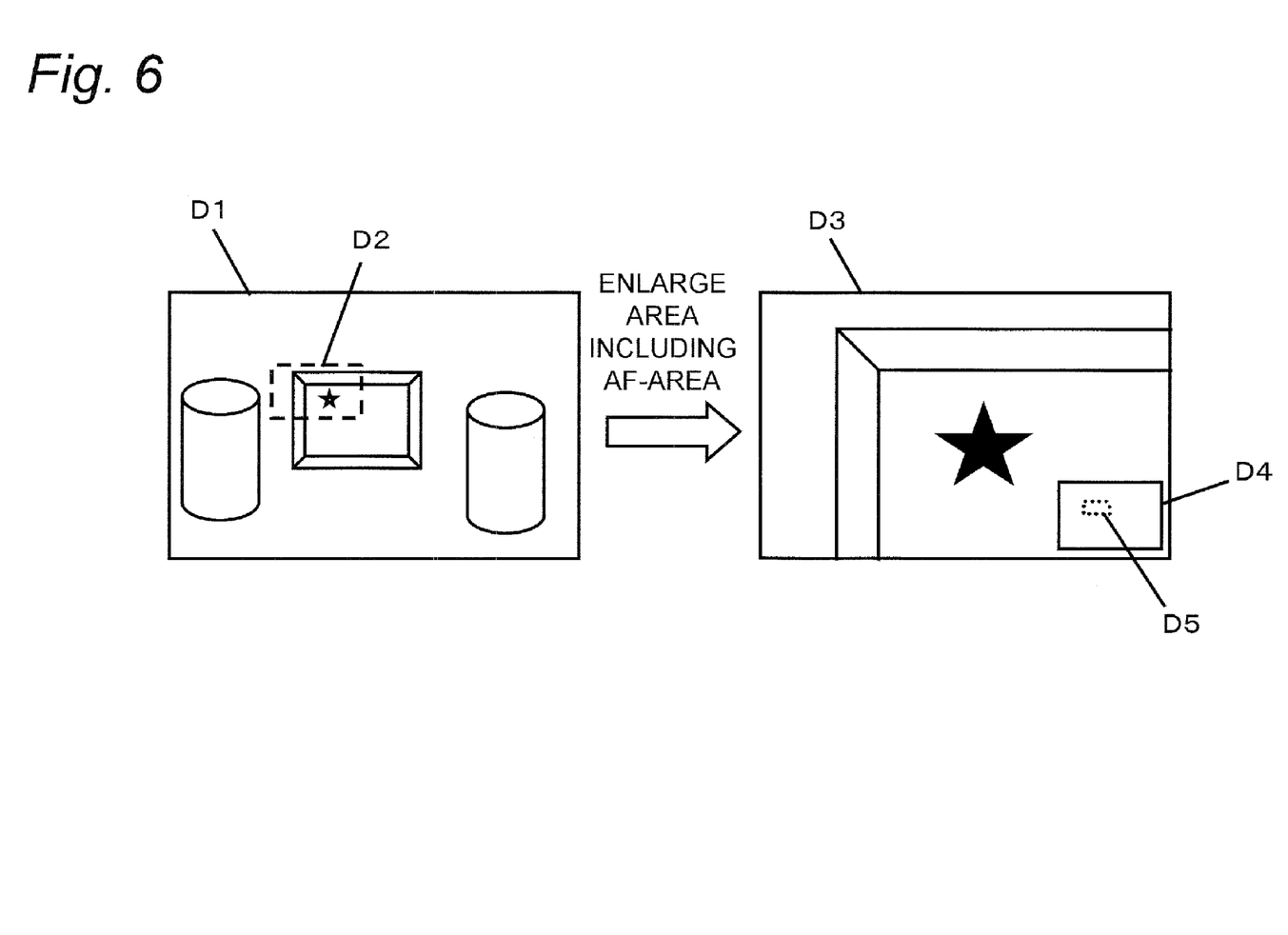
FIG. 6 is a diagram for describing an enlarged display of the imaging apparatus according to the first embodiment.

FIG. 6 is a diagram for describing the enlarged image displayed in the vicinity of the focus area with the camera system 1 set in multi-point AF mode. A frame D1 indicates the whole image captured by the camera system 1. A dashed frame D2 indicates the image area including the focus area. A frame D3 indicates the image area which is enlarged and displayed. The range of the image which is enlarged and displayed is required to include only the area focused by the camera system 1 and not limited to the enlarged display area including only the image area in the dashed frame D2. By displaying the enlarged image area including the focus area in this manner, the user can operate the focus ring 26 while watching the enlarged image of the area in the vicinity of the focus position, and thus can accurately adjust the focus point at the desired position.

Figure 7:
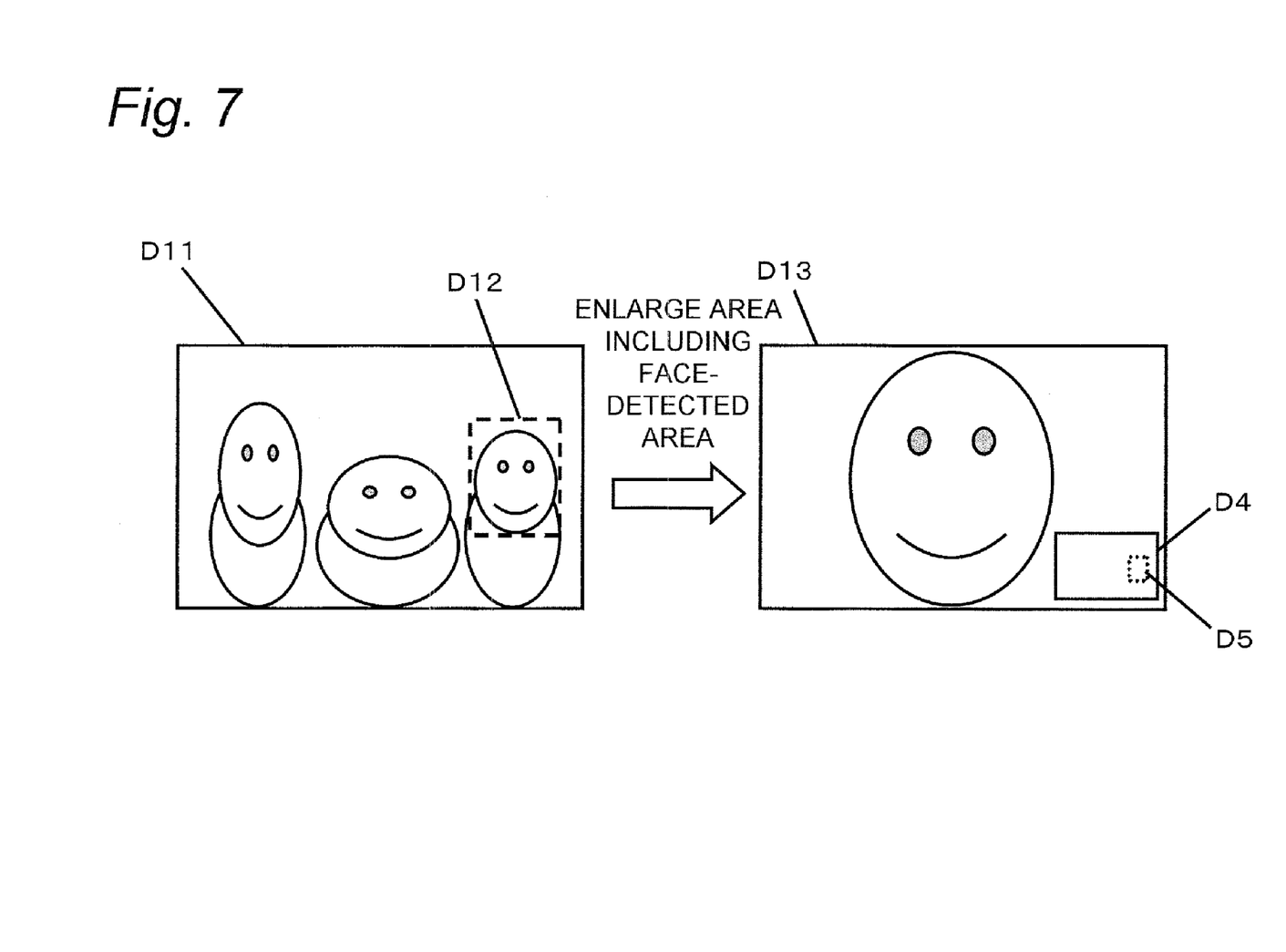
FIG. 7 is a diagram for describing the enlarged display of the imaging apparatus according to the first embodiment.

FIG. 7 is a diagram for describing the enlarged image displayed in the vicinity of the AF area in the face detection AF mode. A frame D11 shows the whole image captured by the camera system 1. A dashed frame D12 shows an image area containing the detected face area. A frame D13 shows the enlarged and displayed image area. It is enough that range of this enlarged image area on display includes the face area focused in the camera system 1 but the range is not limited to an area including the area defined by the dashed frame D12. For example, the enlarged image area on display may not only include the area defined by the dashed frame D12 but also range beyond the defined area. By displaying the enlarged image in this manner, the user can manipulate the focus ring 26 while watching the enlarged image in the vicinity of the face area as a focus position, thereby making it possible to adjust the focus point at the desired position more accurately.

Moreover, an image indicating relative positions of the area of the whole image captured by the camera system 1 and the enlarged image area displayed may be displayed in the enlarged screen displayed on the liquid crystal monitor 10. Specifically, as shown in FIGS. 6 and 7, a frame D4 indicating the whole image area D1 or D11 and a dashed frame D5 indicating the position of the enlarged display area D2 or D12 in the whole area D1 or D11 may be displayed in superposed on the frame D3 or D13, respectively.

It may be configured that by user operation of the cursor button 45 the position of the enlarged image area D2 or D12 can be finely adjusted in four directions of up, down, left and right. As a result, the user can adjust the focus point as the user desires by user's operating the focus ring 26 while confirming the position of the focus area of the system camera 1 relative to the whole image.

The user can change the magnification of the enlarged display by operating the front dial 14. Specifically, in the case where the manual focus adjustment is carried out after the autofocus control, the camera controller 6 can change the magnification of the enlarged image displayed on the LCD monitor 10.

Figure 8:
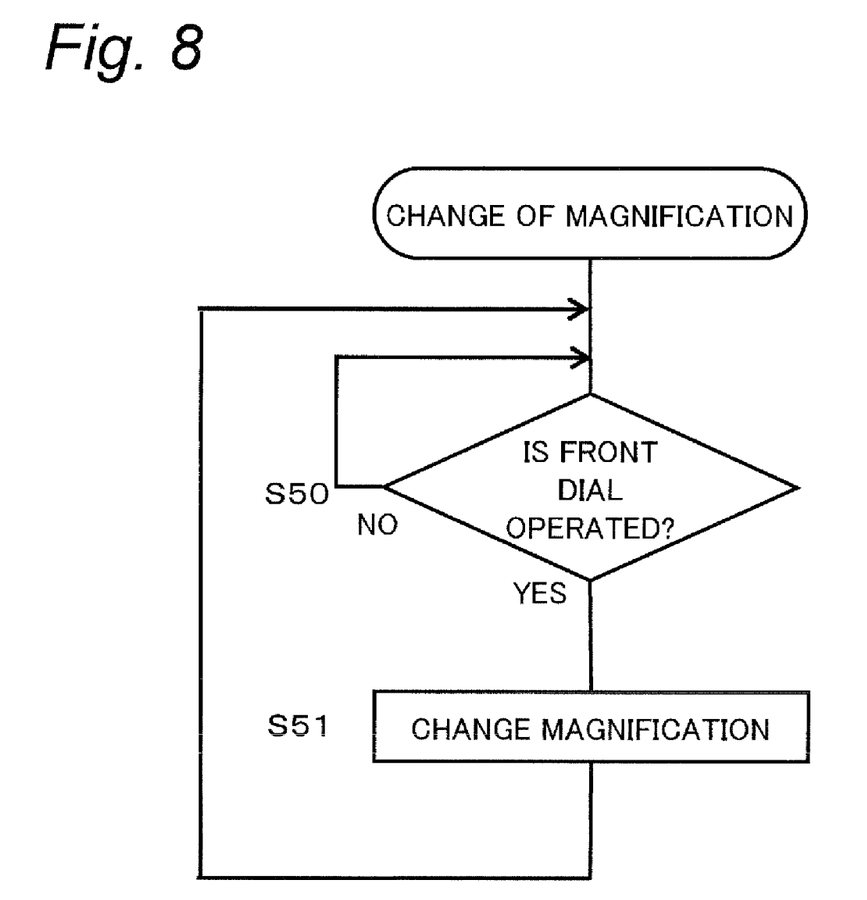
FIG. 8 is a flowchart showing an enlarged display magnification change process for the imaging apparatus according to the first embodiment.
Figure 9:
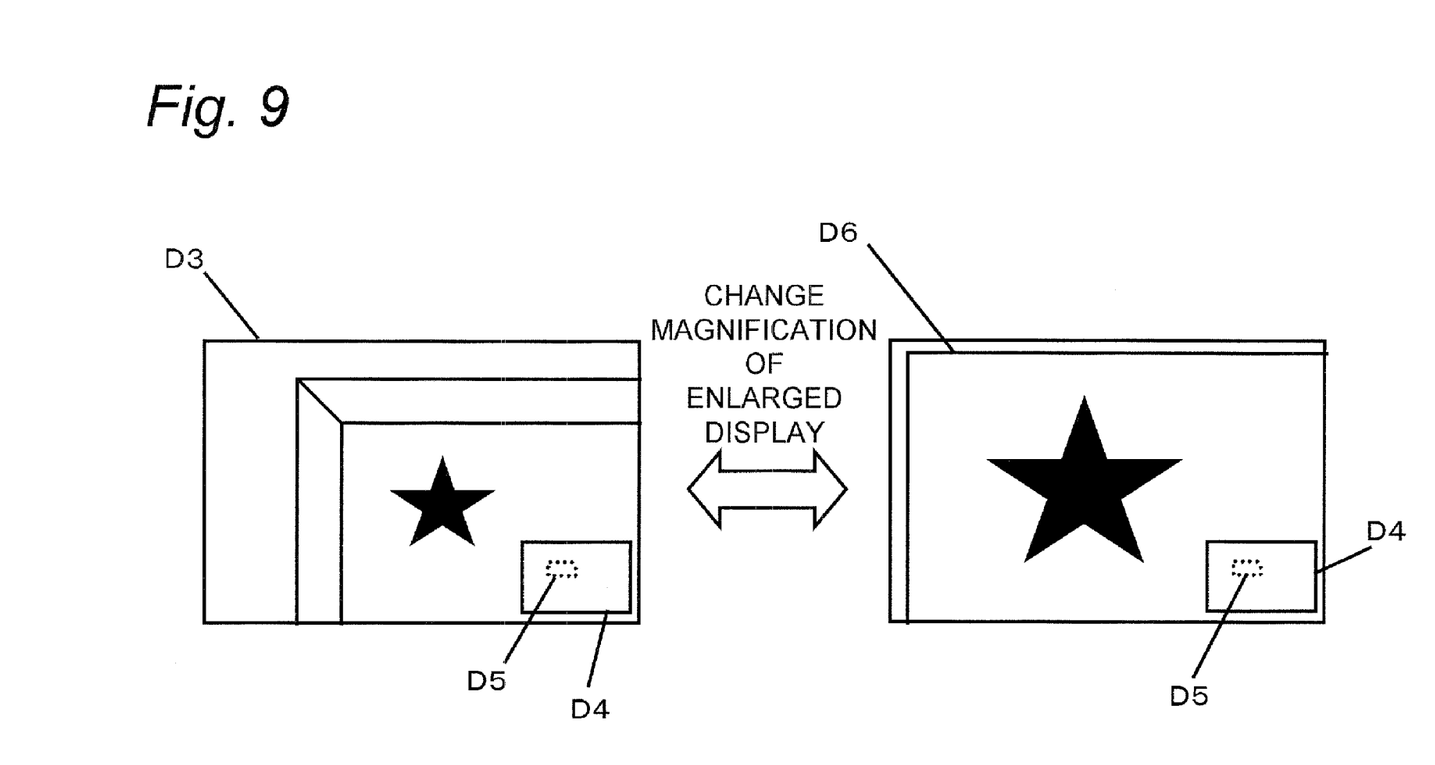
FIG. 9 is a diagram for describing an operation to change the enlarged display magnification for the imaging apparatus according to the first embodiment.
Figure 10:
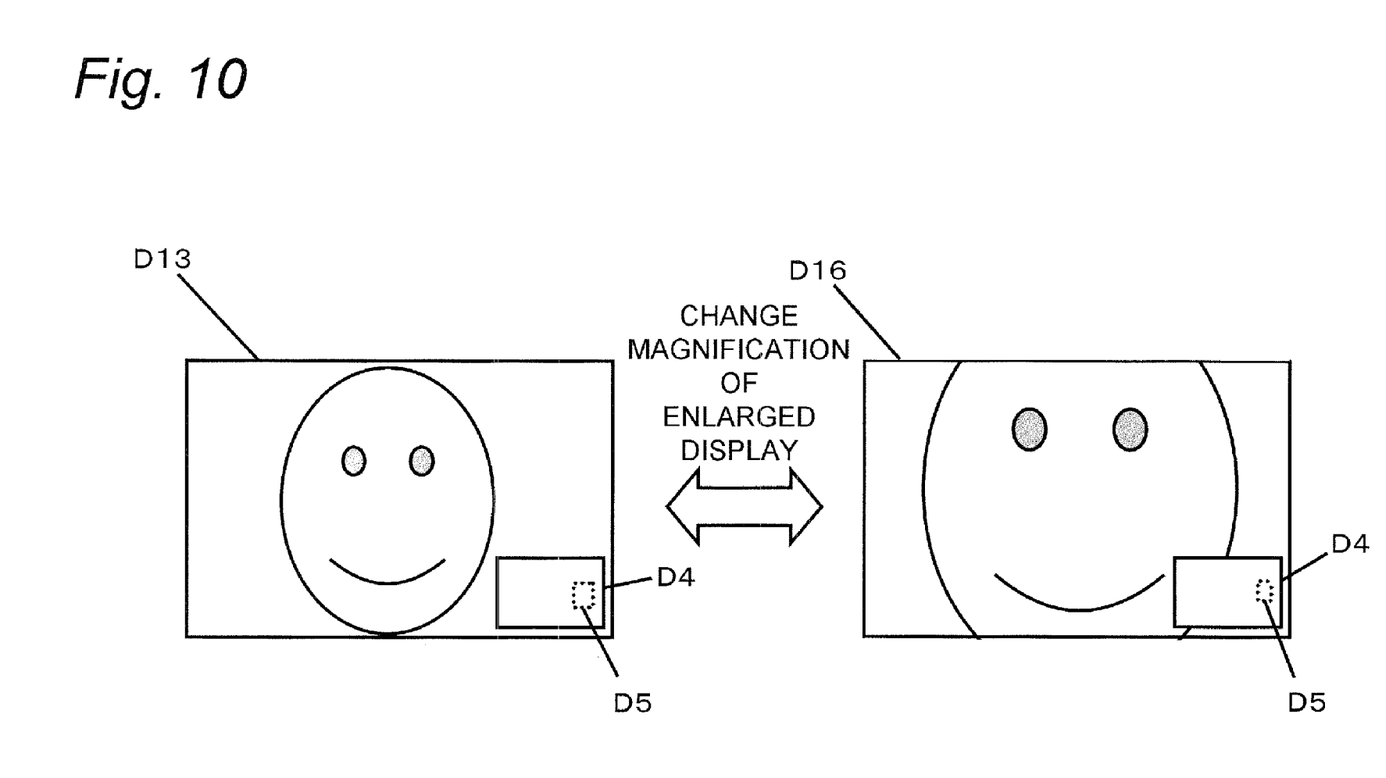
FIG. 10 is a diagram for describing the operation to change the enlarged display magnification for the imaging apparatus according to the first embodiment.

FIG. 8 is a flowchart showing a process of changing the magnification of the enlarged display. This process is performed in the case where the focus area is enlarged and displayed on the LCD monitor 10. While the camera system 1 displays the focus area in enlarged form on the LCD monitor 10, the camera system 1 accepts the user operation on the front dial 14 (S50). The camera system 1, upon acceptance of the user operation of the front dial 14, changes the magnification in accordance with the operation of the front dial 14 (S51). When the magnification of the enlarged image on display is changed, the image is enlarged and displayed with a new magnification after the change. In this manner, the user can cause the image to be enlarged with a different magnification by operating the front dial 14. FIGS. 9 and 10 show change in the displayed images with the magnification in multi-point AF mode and face detection AF mode, respectively. The user can thus change the magnification of the enlarged image as required to facilitate the adjustment of the focus point.

In the camera system 1 according to the present embodiment, the user can finely adjust the focus position by the manual operation of the focus lens 26 while watching the enlarged image in the area including the focus position after the autofocus adjustment. As a result, the user can easily capture a suitable image as desired.

Particularly, in the face detection AF mode, the impression of the face obtained from the completed image is varied depending on the focus position of the face area. For example, the impression appearing in the completed image greatly differs between a case in which the nose is in focus and a case in which the eyes are in focus. In the camera system according to the present embodiment, the focus position can be adjusted by the user operation of the focus lens 26 immediately after focusing the image on the face area of the subject by the face detection AF. Therefore, the image desired by the user can be suitably captured with ease.

Other Embodiments

According to the first embodiment, the configuration having the zoom lens 20 and the OIS lens 24 is illustrated. Nevertheless, this configuration is not essential. The concept of the first embodiment is also applicable to a camera system to which an interchangeable lens having no shake correction function is mounted.

Although the first embodiment illustrates the camera body having no movable mirror, the structure of the camera body is not limited thereto. For example, a movable mirror or a prism to split the subject image may be arranged in the camera body. A movable mirror may be incorporated in an adaptor instead of in the camera body.

According to the first embodiment, the camera system to which an interchangeable lens is mountable is illustrated. Nevertheless, the structure of the camera body is not limited thereto. The concept of the first embodiment is applicable also to a camera having the camera body and the lenses integrated with each other. In short, any camera having both the autofocus function and the manual focus function can be implemented by the concept of the first embodiment.

According to the first embodiment, the AF mode is described to include the multi-point AF mode and the face detection AF mode. Nevertheless, the AF mode is not limited thereto, and any other mode in which the image of the subject is focused automatically is covered by the concept of the first embodiment.

According to the first embodiment, an enlarged image is displayed in the case where the manual focus operation is performed with the release button 13 half-pressed in AF mode. Nevertheless, the embodiment is not limited to this arrangement. For example, an alternative method is available in which the focus area determined by the half-press operation of the release button 13 may be stored in the camera system 1. In this method, the manual focus operation can be accepted based on the stored focus area even after the button 13 is released from the half-pressed state. In short, once a particular image area is determined as a focus area by the autofocus operation, the image can be enlarged and displayed at any timing by the manual focus operation of the camera system 1. Although in the first embodiment the focus state after the autofocus control is maintained by holding half-press of the release button 13, the operation is not limited to this. For example, it may be configured that a dedicated button for maintaining the focus state after the autofocus control is provided so that the focus state can be maintained when the dedicated button is pressed.

The first embodiment illustrates a camera system which performs the autofocus operation according to the contrast detection method. Nevertheless, the autofocus operation is not limited to the contrast detection method. For example, the concept of the first embodiment is applicable also to a camera system which performs the autofocus operation according to the phase difference detection method using a phase difference sensor. More specifically, the phase difference sensor can detect the focus state (the defocus amount in this case) at each of plural points in the subject image formed by the optical system. The camera controller 6, based on the result of detection by the phase difference sensor, controls the optical system in such a manner as to focus the image at any one of the plural points. In the case where the manual focus is changed after the autofocus control operation, the camera controller 6 determines the area of the image to be enlarged in accordance with the point focused by the autofocus control part, and subsequently the LCD monitor 10 is controlled to display an enlarged image.

Industrial Applicability

The concept of the embodiments described above is suitably applicable to an imaging apparatus such as a digital camera, and further, to any other devices for capturing an image, such as a digital movie camera and a mobile phone having a camera function.

What is claimed is:

1. An imaging apparatus comprising:
    an optical system operable to change a focus state of an image of a subject;
    an imaging unit operable to capture the image of the subject formed by the optical system and generate image data;
    a button configured to be positioned in a first-pressed state and a second-pressed state;
    an autofocus controller operable to control the optical system to focus on the image indicated by the image data generated by the imaging unit when the button is positioned in the first-pressed state;
    a manual focus changing unit operable to be operated manually by a user to change the focus state of the optical system;
    a display unit operable to display the image based on the image data generated by the imaging unit; and
    a display controller operable to control the display unit;
    wherein the display controller detects whether the manual focus changing unit is operated by the user while the button is maintained in the first-pressed state, and
    when detecting that the manual focus changing unit is operated by the user while the button is maintained in the first-pressed state, the display controller determines, as an enlarged area, an area in the focused image by the autofocus controller and controls the display unit to display the image of the determined enlarged area.

2. The imaging apparatus according to claim 1, further comprising a focus state detector operable to detect the focus state of the image indicated by the image data generated by the imaging unit, wherein the autofocus controller controls the optical system to focus the image based on a result of detection by the focus state detector.

3. The imaging apparatus according to claim 1, further comprising a face detector operable to detect a face area in the image of the subject formed by the optical system, wherein the autofocus controller controls the optical system to focus the image on the face area detected by the face detector.

4. The imaging apparatus according to claim 1, wherein the display unit displays information indicating relative positions of a whole area of the image and the enlarged area together with the enlarged image.

5. The imaging apparatus according to claim 1, wherein the autofocus controller further includes a magnification changing unit operable to change a magnification of the enlarged image displayed on the display unit.

6. A camera body to which an interchangeable lens is mountable, the interchangeable lens including an optical system operable to change a focus state of an image of a subject and a manual focus changing unit operable to be operated manually by a user to change the focus state of the optical system, the camera body comprising:
    an imaging unit operable to capture the image of the subject formed by the optical system and generate image data;
    a button configured to be positioned in a first-pressed state and a second-pressed state;
    an autofocus controller operable to control the optical system to focus on the image indicated by the image data generated by the imaging unit when the button is positioned in the first-pressed state;
    a display unit operable to display the image based on the image data generated by the imaging unit; and
    a display controller operable to control the display unit;
    wherein the display controller detects whether the manual focus changing unit is operated by the user while the button is maintained in the first-pressed state, and
    when detecting that the manual focus changing unit is operated by the user while the button is maintained in the first-pressed state, the display controller determines, as an enlarged area, an area in the focused image by the autofocus controller and controls the display unit to display the image of the determined enlarged area.

7. The camera body according to claim 6, further comprising a focus state detector operable to detect the focus state of the image indicated by the image data generated by the imaging unit, wherein the autofocus controller controls the optical system to focus the image based on a result of detection by the focus state detector.

8. The camera body according to claim 6, further comprising a face detector operable to detect a face area in the image of the subject formed by the optical system, wherein the autofocus controller controls the optical system to focus the image on the face area detected by the face detector.

9. The camera body according to claim 6, wherein the display unit displays information indicating relative positions of a whole area of the image and the enlarged area together with the enlarged image.

10. The camera body according to claim 6, wherein the autofocus controller further includes a magnification changing unit operable to change a magnification of the enlarged image displayed on the display unit.

11. An imaging apparatus comprising:
    an interchangeable lens configured to be mountable to a camera body, the interchangeable lens including:
        a focus ring configured to be operated by a user; and
        a focus lens configured to be moved by an operation of the focus ring by the user; and the camera body configured to enable the interchangeable lens to be mounted thereto, the camera body including:

an image sensor operable to capture image data of a subject incident through the interchangeable lens;

a button configured to detect a first-pressed state and a second-pressed state; and a camera controller operable to control the focus lens to focus on a position of the captured image data when the button detects the first-pressed state; and a display section operable to enlarge the image data captured by the image sensor when the button is maintained in the first-pressed state while the focus ring is operated by the user, and operable to display data including the enlarged image data.

12. The imaging apparatus according to claim 11, wherein the display data further includes position information relating to a position of the enlarged image data in the captured image data, and the display section is operable to display the position information.

13. A camera body to which an interchangeable lens is mountable, the interchangeable lens including a focus ring configured to be operated by a user and a focus lens configured to be moved by an operation of the focus ring by the user, the camera body comprising:

an image sensor operable to capture image data of a subject incident through the interchangeable lens;

a button configured to detect a first-pressed state and a second-pressed state; and a camera controller operable to control the focus lens to focus on a position of the captured image data when the button detects the first-pressed state; and a display section operable to enlarge the image data captured by the image sensor when the button is maintained in the first-pressed state while the focus ring is operated by the user, and operable to display data including the enlarged image data.

14. A camera body according to claim 13, wherein the display data further includes position information relating to a position of the enlarged image data in the captured image data, and the display section is operable to display the position information.

* * * * *